United States Patent [19]

Yukichi et al.

[11] Patent Number: 5,450,526
[45] Date of Patent: Sep. 12, 1995

[54] FUZZY NEURON HAVING PIXEL ADDRESS MEMORY

[75] Inventors: Koji Yukichi; Oh Masanari, both of Fukuoka, Japan

[73] Assignee: Rohm Co., Ltd., Kyoto, Japan

[21] Appl. No.: 144,647

[22] Filed: Oct. 28, 1993

[30] Foreign Application Priority Data

Jan. 29, 1993 [JP] Japan .................................. 5-014187

[51] Int. Cl.$^6$ ............................................. G06F 15/18
[52] U.S. Cl. ......................................... 395/3; 395/11; 395/22; 382/156
[58] Field of Search ...................... 395/3, 11, 61, 141, 395/900, 51, 22; 382/14, 15

[56] References Cited

U.S. PATENT DOCUMENTS

| | | | |
|---|---|---|---|
| 4,620,286 | 10/1986 | Smith et al. ............................ | 395/77 |
| 5,126,600 | 6/1992 | Zhang ................................... | 326/35 |
| 5,131,071 | 7/1992 | Tsutsumi et al. ..................... | 395/900 |
| 5,167,005 | 11/1992 | Yamakawa ............................. | 395/3 |
| 5,262,833 | 11/1993 | Fukushima et al. .................. | 395/900 |

FOREIGN PATENT DOCUMENTS

2-310782 of 1990 Japan ............................ G06F 15/70

OTHER PUBLICATIONS

Recognition of Circle Form Using Fuzzy Sequential System T. Watanabe et al., Aug. 1991 IEEE.

A Fuzzy Neuron and Its Application to a Hand-Written Character Recognition System Yamakawa, IEEE 11-14 Jun. 1991 pp. 1369-1372.

Fuzzy Neural Net Approach to Control Systems Gupta et al. IEEE, 3-5 Dec. 1990 pp. 483-488.

A Design Algorithm of Membership Functions for a Fuzzy Neuron Using Example-Based Learning Yamakawa et al. 8-12 Mar. 1992 pp. 75-82.

On Fuzzy Neuron Models Gupta et al. IEEE 8-14 Jul. 1991 pp. II-431-436.

"A Fusion of Fuzzy Logic and Neuroscience-A Fuzzy Neuron Chip and Its Application to a Pattern Recognition System—" by Takeshi Yamakawa, *International Fuzzy System Association,* Brussels, 1991, 4 pp.

*Primary Examiner*—Robert W. Downs
*Assistant Examiner*—Richemond Dorvil
*Attorney, Agent, or Firm*—Brumbaugh, Graves, Donohue & Raymond

[57] ABSTRACT

A fuzzy neuron of a serial processing type includes memory for storing a membership function value $\mu(j, i)$, an address $A(j, i)$ of each of pixels of pattern data in which the membership function value is defined, and a membership function identifier J to which the membership function value belong, in a set in a membership function memory (102). The fuzzy neuron is not fixed in a hardware manner for the purpose of recognizing a specific pattern, but it can be applied to an arbitrary pattern in a software manner by rewriting the membership function. Various characteristic division areas can be defined and, for this reason, it is possible to set a characteristic division area best for recognition every pattern and thus a rate of recognition can be enhanced to a great extent when compared with the prior art.

4 Claims, 5 Drawing Sheets

FUZZY NEURON HAVING PIXEL ADDRESS MEMORY

BACKGROUND OF THE INVENTION

1. Field of the Invention

The present invention relates to a fuzzy neuron which can be used in the field of pattern recognition such as image recognition, voice recognition and the like.

2. Description of the Prior Art

A fuzzy neuron extracts the characteristic data of a pattern by means of characteristic division lines and performs a fuzzy operation on the pattern characteristic data and a membership function to thereby achieve pattern recognition.

Referring to the above-mentioned characteristic division lines, normally, a plurality of straight lines disposed in a horizontal or vertical direction are used in common in all recognition target patterns. In other words, the shape, position, number and the like of the characteristic division lines are not changed according to the target patterns. For example, in Unexamined Japanese Patent Publication (Kokai) Hei-2-310782 (which is hereinafter referred to as reference 1) and Yamakawa: "A Fusion of Fuzzy Logic and Neuroscience—A Fuzzy Neuron Chip and Its Application to a Pattern Recognition System—" International Fuzzy System Association (IFSA) '91 (which is hereinafter referred to as reference 2), in order to recognize handwritten figures which range from 0 to 9, there are arranged seven linear characteristic division lines CDL1 to 7 as shown in FIGS. 4A to 4D, which lines are used in common with respect to all of the figures. However, this is only for the purpose of simplification of the system and thus this is not a restraint based on the principles of the fuzzy neuron.

In fact, according to the reference 1, it is preferable to select the optimum characteristic division lines according to the target patterns and, as the preferable examples, there are illustrated parabolic characteristic lines (CDL 1 to 4 in FIG. 5A) with respect to a FIG. "0", or there are shown concentric characteristic lines (CDL 1 to 3 in FIG. 5B) with respect to an English letter "X".

However, in either of the references 1 and 2, there is not shown any means which can change the characteristic division lines according to the target patterns. Also, a realized example of such means has never been reported so far.

When the patterns to be treated are small in number and simple like the handwritten figures, it is not so difficult to set characteristic division lines which are common to all of the patterns. However, the more the patterns increase in number, or the more complicated the patterns are, the more difficult it is to set the common characteristic division lines.

If a large number of characteristic division lines are set in order to cover all patterns, then there are present many characteristic division lines which are of no use for individual patterns, resulting in a wasteful system. Even if there is provided a signal which prevents an operation from being executed on the unnecessary characteristic division lines, as in an embodiment shown in the reference 1, it cannot be denied that the loss of processing time is produced. On the other hand, if the number of the characteristic division lines is minimized, then the characteristics of the individual patterns cannot be taken up, which leads to a lowered rate of recognition.

The above-mentioned problems found in the prior art are caused by an unreasonable idea that the characteristic division lines are used in common to all patterns. It is desirable that the characteristic division lines can be set arbitrarily in the position, shape, number and the like thereof for every pattern so as to be able to extract best the characteristics of the patterns.

SUMMARY OF THE INVENTION

Accordingly, it is an object of the invention to provide means which is able to set a characteristic division area for every pattern.

The present invention relates to a fuzzy neuron which is able to set an arbitrary characteristic division area and also which allows a set of a membership function and an address of a pixel corresponding to the membership function to be stored in a memory which stores therein membership functions.

In particular, in attaining the above object, according to the first aspect of the invention, there is provided fuzzy neuron system which comprises: a membership function memory for storing the following three data in a set, a membership function, an identifier of the membership function, addresses of respective pixels corresponding to the respective elements of the membership function; a temporary memory for storing the part-way results of an operation; means for calling out pattern data from an image memory in accordance with an address signal called out from the membership memory; means for calling the operation part-way results from the temporary memory in accordance with a identifier signal called from the membership function; means for performing an operation by use of the membership function, pattern data and operation part-way results and for storing the operation result again in the temporary memory in accordance with the identifier signal; means for performing a minimum value operation on all data stored in the temporary memory after all data in the membership function memory are called out; and, means for performing a reverse processing on forbidden membership functions when performing the minimum value operation.

Further, in attaining the above object, according to the second aspect of the invention, there is also provided a fuzzy neuron system which comprises: a membership function memory for storing the following two data in a set, a membership function, addresses of respective pixels corresponding to the respective elements of the membership function, and, in which membership function memory, there are previously stored the above data of the membership function and data of the addresses that have been classified by membership functions, and there are further inserted signals which are respectively disposed every divisions of the membership function to indicate the divisions; a temporary memory for storing the part-way result of an operation; means for updating the current address of the temporary memory each time the signal indicating the division of the membership function is called from the membership function memory; means for calling pattern data from an image memory in accordance with the address signal called from the membership function memory; means for performing an operation by use of the membership function, pattern data and the operation part-way result called from the current address of the temporary memory, and storing the operation result again in the current address of the temporary memory; means for performing a minimum value operation on all data stored in the temporary memory after all data in the membership function memory are called; and, means for performing a reverse processing on forbidden membership functions when performing the minimum value operation.

Before the operation of the invention is discussed, description will be described of the operation of the fuzzy neuron.

It is assumed that, in a fuzzy neuron to recognize a certain pattern X, a total of m membership functions are set.

Identifiers 1 to m are respectively given to the respective membership functions and these are expressed as MF(j), j=1, 2, ..., MF(j) has been set, consists of $K_j$ pcs. of elements (one element corresponds to one pixel of pattern data.), MF(j) also consists of $K_j$ pcs. of elements. The ith element of MF(j) is expressed as $\mu(j, i)$, i=1, 2, ..., $K_j$.

It is assumed that pattern data of a certain pattern Y is given to the above-mentioned fuzzy neuron. In this case, the fuzzy neuron calculates a probability, PRB(X=Y), that the given pattern Y is equal to X, according to the following operation.

$$g_j = \bigvee_{J=1}^{K_j} \{\mu(j,i) \vee s(j,i)\} \quad (1)$$

$$PRB(X = Y) = \bigvee_{J=1}^{m} \{F(g_j)\} \quad (2)$$

$F(g_j) = g_i$ when $MF(j)$ is a passing membership function (3)

$= \bar{g}_i$ when $MF(j)$ is a forbidden membership function, s(j, i) is the pattern data of a pixel corresponding to $\mu(j, i)$, and symbols $\vee$, $\wedge$ respectively stand for a maximum value operation and a minimum value operation.

The operation method of the fuzzy neuron includes, besides the above-mentioned operation method, another method in which a forbidden membership function has been previously inverted. However, the present invention is premised on the above-mentioned operation method.

Now, description will be given below of the operation of the invention.

In the above-mentioned prior art, due to the fact that the characteristic division lines are used in common to all patterns, it is not necessary to store the addresses of pixels in the membership function memory. In other words, since the pixel addresses and transmission sequences of the pattern data that are transmitted from the image memory and sensors are previously fixed in common to all patterns, the membership function data have only to be stored in the membership function memory in such a manner that the membership function data are matched to the addresses and transmission sequences of the pattern data. However, this limits the freedom of setting the characteristic division lines to a very narrow range that the characteristic division lines must be selected from the previously set characteristic division lines. (Selection of the characteristic division lines is made by a 1-bit control signal which instructs whether an operation is performed on the subject characteristic division line (reference 1)).

On the other hand, according to the invention, by combining and storing the address of a pixel and a membership function in a membership function memory, the setting of a characteristic division area can be made programmable.

In the above-mentioned first means, the membership function data $\mu(j, i)$, pixel address A(j, i) and membership function identifier j are sequentially called in a set from the membership function memory. The pixel address A(j, i) specifies the address of the image memory and calls pattern data s(j, i) stored in the image memory therefrom. On the other hand, the membership function identifier j specifies the address of the temporary memory and calls data stored therein.

A minimum value operation $\mu(j, i) \wedge s(j, i)$ is executed on the membership function data $\mu(j, i)$ and pattern data s(j, i), and a maximum value operation is executed on the resultant value and data called from the temporary memory. The result of the maximum value operation is again stored in the address of the temporary memory that is specified by the identifier j. That is, the part-way results of the operation of the operation according to the equation (1) are classified by the membership functions and stored in the temporary memory.

It should be noted here that, at the time of the start of the operation, the contents of the temporary memory are all cleared to "0".

As a result of repetition of such series of processings, after the data of the membership functions are all read out, the final results $g_j$ of the equation (1) are classified by the membership functions and stored in the temporary memory.

Finally, the final results $g_i$ are called from the temporary memory and, if the identifier j is the identifier of a forbidden membership function, then there is added a processing in which the final result $g_j$ is inverted (equation 3), and after then, if the minimum value operation is completely executed, then there can be obtained the PRB(X=Y) of the equation (2).

In the above-mentioned second means, the data within the membership function memory are previously sorted in the order of the identifiers of the membership functions. This eliminates the need of provision of the membership function identifiers and, instead, there is inserted a signal $C_3$ which shows the division of the membership function.

Each time $C_3$ is called, the current address of the temporary memory is incremented. Other processings are the same as in the first means. That is, after the contents of the membership function memory are all read out, similarly, the final results $g_j$ are classified and stored by the membership functions in the temporary memory.

Finally, similarly as in the first means, PRB(X=Y) is calculated to thereby complete the processings.

DETAILED DESCRIPTION OF PREFERRED EMBODIMENTS

Figure 1:
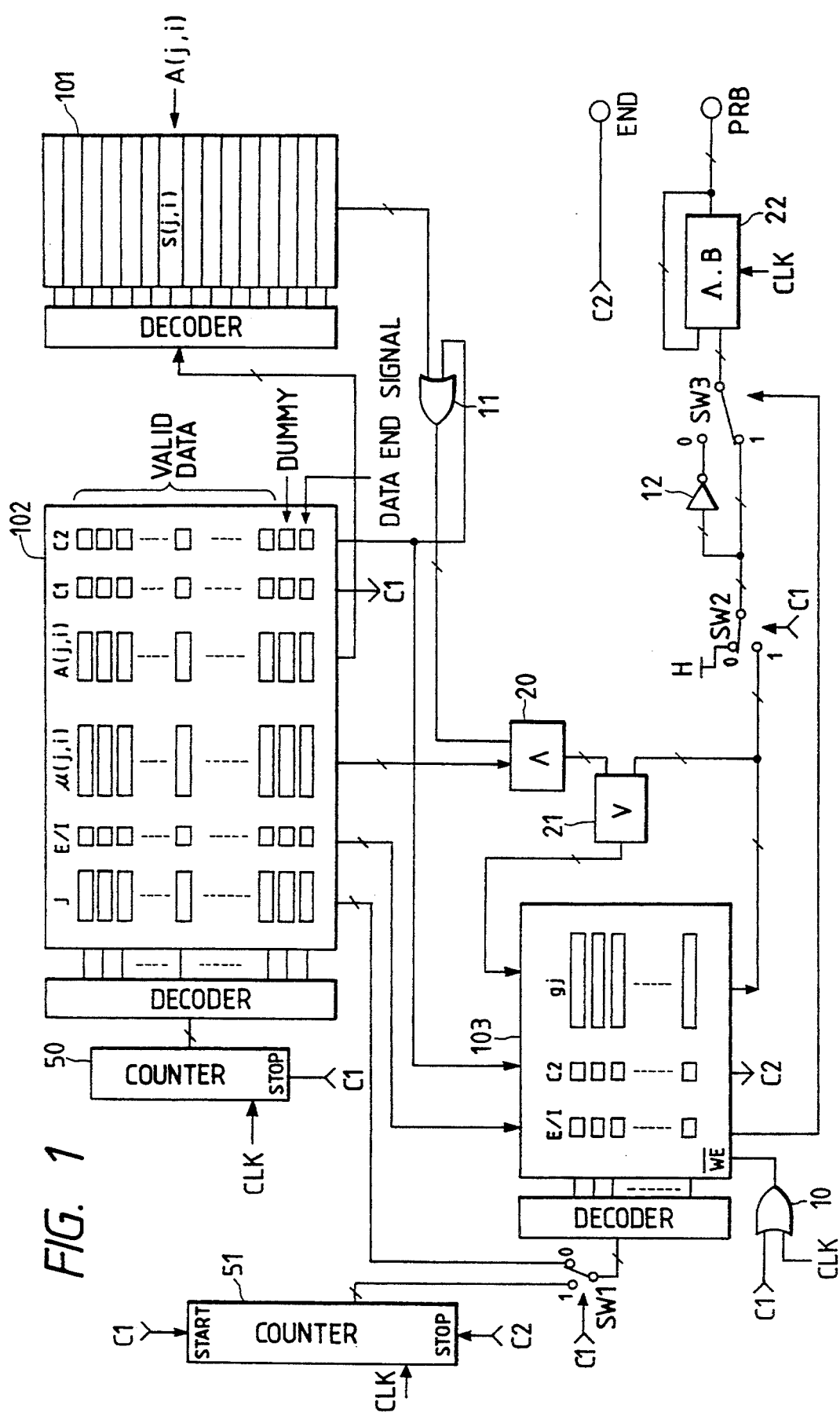
FIG. 1 is a circuit diagram of a first embodiment of a fuzzy neuron according to the invention.

In FIG. 1, there is shown an embodiment of the above-mentioned first means according to the invention. In an image memory 101, there is stored the pattern data of a pattern to be recognized. The pattern data may be or may not be binary data. The pattern data $s(j, i)$ corresponding to a pixel is stored in an address $A(j, i)$.

The following data are stored in a set in a membership function memory 102.

(a) membership function data $\mu(j, i)$;
(b) an identifier J of a membership function;
(c) an address $A(j, i)$ of an image memory in which the data of pixels corresponding to the data $\mu(j, i)$;
(d) a 1-bit signal E/I showing whether a membership function is a forbidden membership function or a passing membership function, where if it is the passing membership function, then E/I=1, and if it is the forbidden membership function, then E/I=0;
(e) a 1-bit signal C2 showing whether the data is valid data or dummy data, where if C2=1, then the data is the dummy data;
(f) a 1-bit signal C1 showing the end of the above-mentioned data (a) to (e), where if C1=1, then the data is ended.

The data are classified into valid data, dummy data and data end signal, and these are then stored sequentially as shown in FIG. 1. The data are classified by means of combinations of C1 and C2 signals.

The valid data are used actually in the operation of the equation (1). C1, C2 are 0, 0, respectively.

The dummy data are used to end all the processings, but are not used in the operations of the equations (1) to (3). C1, C2 are 0, 1, respectively. Also, "1" is stored in all of the membership function data $\mu(j, i)$, m+1 (when the number of membership functions=m) is stored in the identifier J, and arbitrary data are stored in others.

The data end signal notifies the end of the data stored in the membership function memory, but this signal, similarly, is not used in the operations of the equations (1) to (3). C1, C2 are 1, 1, respectively.

Next, description will be given below of the operation of the present embodiment.

[Execution of the operation of the equation (1)]

Simultaneously when the processing is started, the contents of the temporary memory 103 are cleared and a counter 50 starts counting up. The counter 50 increments the addresses of a membership function memory 102 sequentially and the above-mentioned data (a) to (f) are read out sequentially from the membership function memory.

While the data are valid data, a switch SW1 is set at the 0 side thereof by the signal C1 and the identifier J specifies the address of the temporary memory 103. The temporary memory 103 repeats a READ mode and a WRITE mode every half cycle of a clock signal CLK. The mode repetition is executed simultaneously when the data are read out from the membership function memory.

E/I and C2 out of the data read out from the membership function memory are written, as they are, into the J addresses of the temporary memory 103. On the other hand, the membership function data $\mu(j, i)$ pass through the following processing route and the results of the passage are written into the J addresses of the temporary memory 103.

The membership function data $\mu(j, i)$ at first are input to one of the input terminals of a minimum value operation circuit 20. The pattern data $s(j, i)$ at the $A(j, i)$ addresses of the image memory 101 are input into the other input terminal of the minimum value operation circuit 20. (When the pattern data $s(j, i)$ pass an OR gate 11, because of C2=2, it pass through the OR gate 11 as it is.) The outputs $\mu(j, i) \lor s(j, i)$ of the minimum value operation circuit 20 are input to one of the input terminals of a maximum value operation circuit 21. The data that are read out from the J addresses of the temporary memory 103 are input to the other input terminal of the circuit 21, and the maximum value operation results of the two kinds of data are stored again at the J addresses of the temporary memory 103.

After the valid data are all called from the membership function memory 102, the results $g_j$ of the equation 3, E/I, and C2 are stored by the membership functions at 1-m addresses of the temporary memory 103.

Next, the dummy data are read out from the membership function memory 102. For the dummy data, because of C2=1, the OR gate outputs 1. Also, since the data $\mu(j, i)$ are all "1", the outputs of the minimum value operation circuit 20 and maximum value operation circuit 21 are 1, and C2, $g_1 = 11 \ldots 1$ are stored at the m+1 address of the temporary memory 103.

[Execution of the operations of the Equations (2), (3)]

From the membership function memory, there are read out the data end signals finally. At this time, C1 is allowed to be equal to 1 (C1=1), and the counter 50 is caused to stop counting up by C1. Also, the switch SW1 is changed over to the 1 side thereof, and the counter 51 starts counting up. Further, the output of the OR gate 10 is fixed to H, with the result that the temporary memory 103 is fixed to the READ mode and is thus inhibited from writing. Also, the switch SW2 is changed over to the 1 side thereof.

As the counter 51 counts up, the data of the temporary memory 103 are read out sequentially. As the results of the above-mentioned processings, the operation results of $g_j$ (j=1, 2, ..., m) as to the respective membership functions, E/I showing whether the membership function is a forbidden membership function or a passing membership function, and C2=0 are stored in the addresses 1-m.

When E/I=1, then a switch SW3 is set at the 1 side thereof and when E/I=0, then the switch SW3 is set at the 0 side thereof. As a result of this, for the passing membership function, $g_j$ itself is input to a minimum hold circuit 22, while for the forbidden membership function, the inverted version of $g_j$ is input to the minimum hold circuit 22. The inverting processing is executed by an invertor 12 (Equation 3).

The minimum hold circuit 22 is a circuit which is used to find the minimum value of time series data. The circuit 22 includes therein a register and holds data therein. The minimum hold circuit 22 compares the currently holding data with the input data and, when the input data is smaller then the currently holding data, then it performs a processing to rewrite or replace the content of the register with the input data.

As the result that $g_j$ (j=1, 2, ..., m) or the inverted data thereof are transmitted sequentially from the temporary memory 103 to the minimum hold circuit 22, finally, the operation results PRB(X, Y) of the equation 2 are held in the minimum hold circuit 22, which results are to be output to the terminal PRB.

[End of All Processings]

Finally, the dummy data are read out from the m+1 address of the temporary memory 103. Since, in the dummy data, $g_j$=111 ... 11, the dummy data have no influence on the outputs of the minimum hold circuit 22. At this time, C2 becomes 1 for the first time and causes the counter 51 to stop counting up and, at the same time, outputs 1 to a terminal END, thereby notifying all processings are ended.

By the way, when the pattern data are binary data, then the minimum value operation circuit 20 may be replaced by an AND gate.

Figure 2:
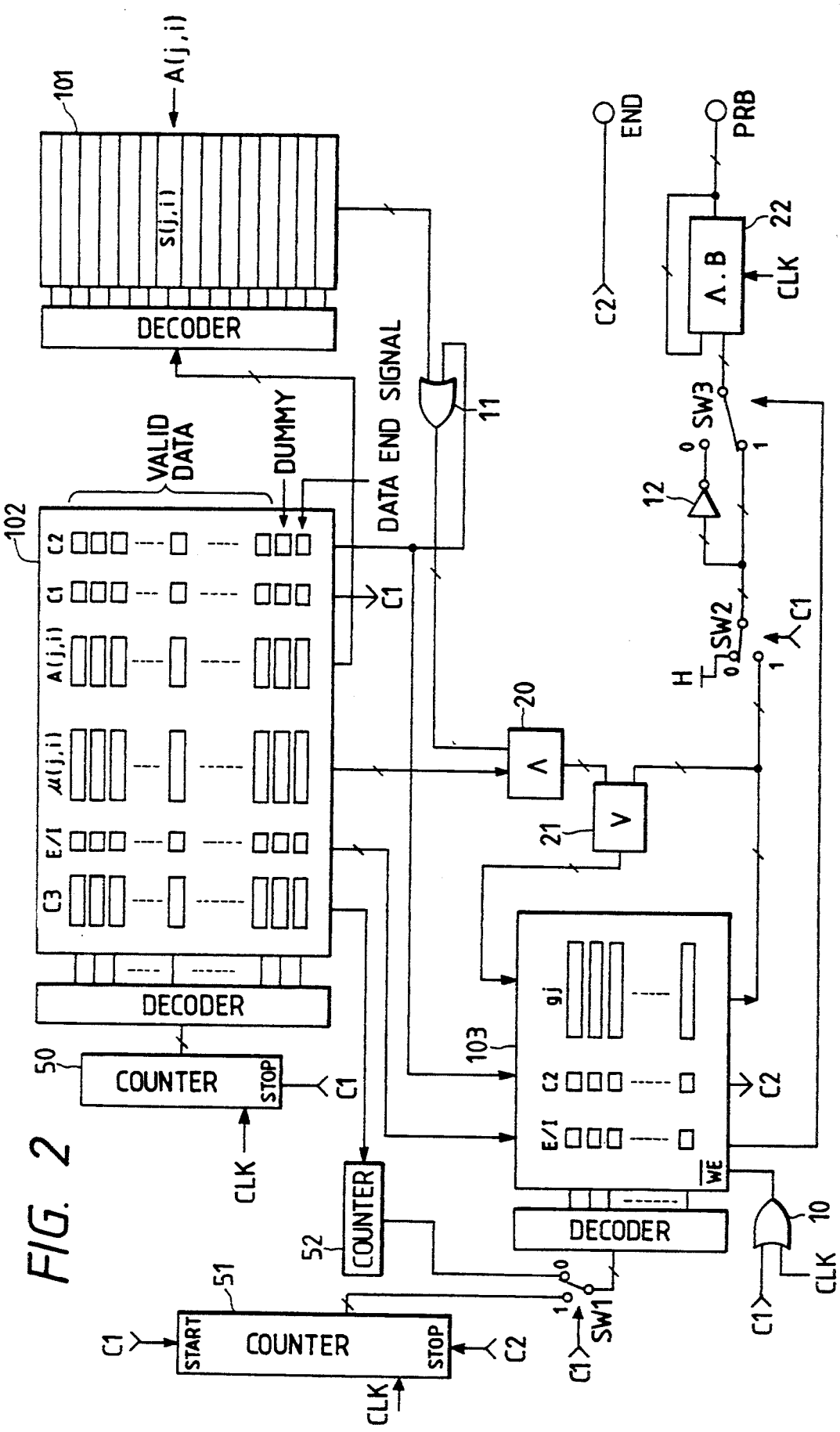
FIG. 2 is a circuit diagram of a second embodiment of a fuzzy neuron according to the invention.

In FIG. 2, there is shown a second embodiment of the invention.

The following data are stored in a set in the membership function memory 102.

(a) membership function data $\mu(j, i)$;
(b) an address $A(j, i)$ of an image memory in which the pattern data of pixels corresponding to the data $\mu(j, i)$ are stored;
(c) a 1-bit signal C3 showing the division of the membership function. It is assumed that, only at the beginning of each of the membership functions, C3=1;
(d) a 1-bit signal E/I showing whether the function is a forbidden membership function or a passing membership function. For the passing membership function, E/I=1, and for the forbidden membership function, E/I=0;
(e) a 1-bit signal C2 showing whether the data is valid data or dummy data. When C2=0, then it is valid data and, when C2=1, then it is the dummy data,; and
(f) a 1-bit signal C1 showing the end of the above data (a) to (e). When C1=1, then the data are ended.

The above-mentioned data (a) to (f) are previously sorted by the membership functions. That is, at first the membership function data having an identifier J=1 is stored and the membership function data having an identifier J=m is stored finally, (when the number of the membership functions are m in total). And, only at the beginning of each of the data, C3=1.

The signal C3 works in the same manner as the identifier J. That is, each time the signal C3 becomes 1, the counter 52 counts up one by one. Since the signal C3 becomes 1 for each of divisions of the membership function, similarly to the embodiment 1, $g_j$ is stored in the temporary memory 103 for each membership function.

Others are all the same as those in the embodiment 1.

Figure 3A:
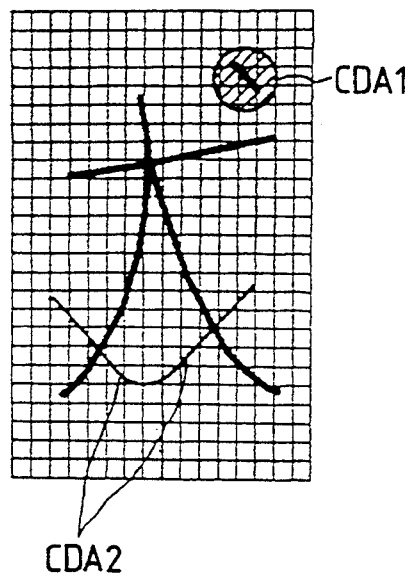
FIGS. 3A to 3C are explanatory views of examples of characteristic division areas according to the invention.
Figure 3B:
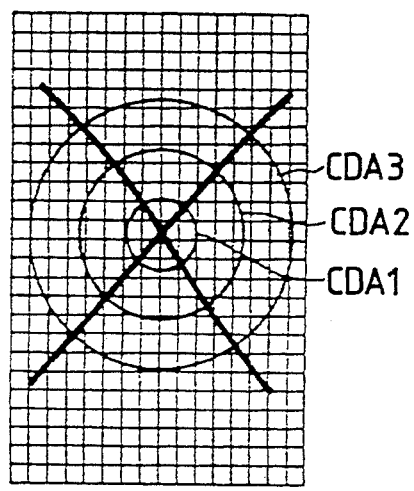
Figure 3C:
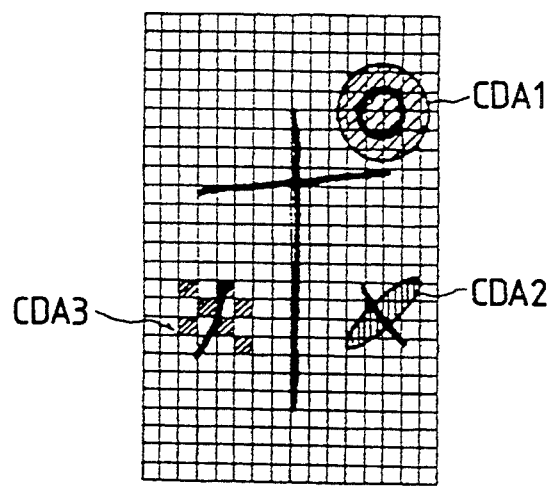
Figure 4A:
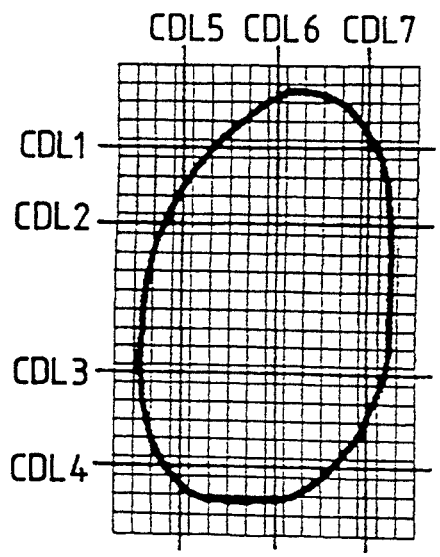
FIGS. 4A to 4D are explanatory views of examples of characteristic division lines according to the invention.
Figure 4B:
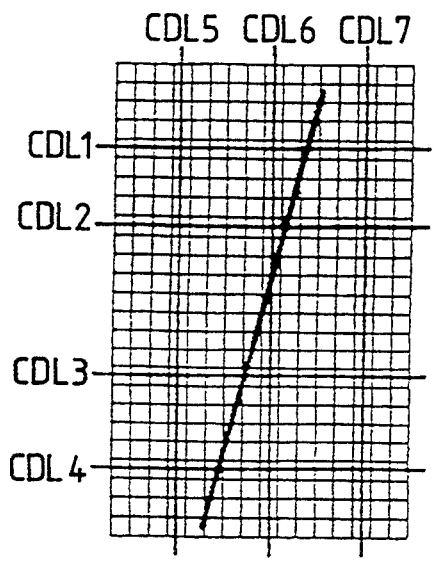
Figure 4C:
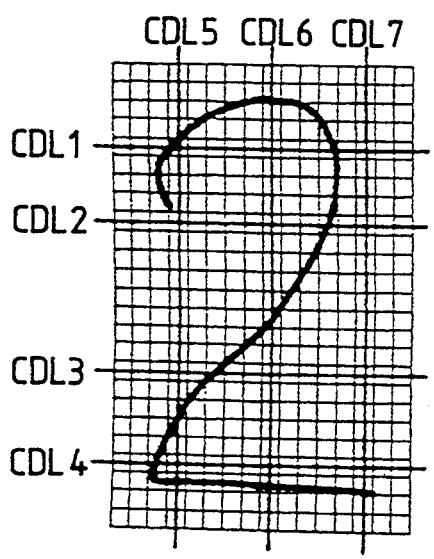
Figure 4D:
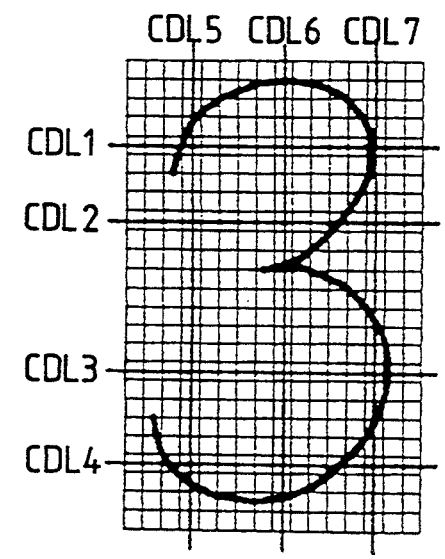
Figure 5A:
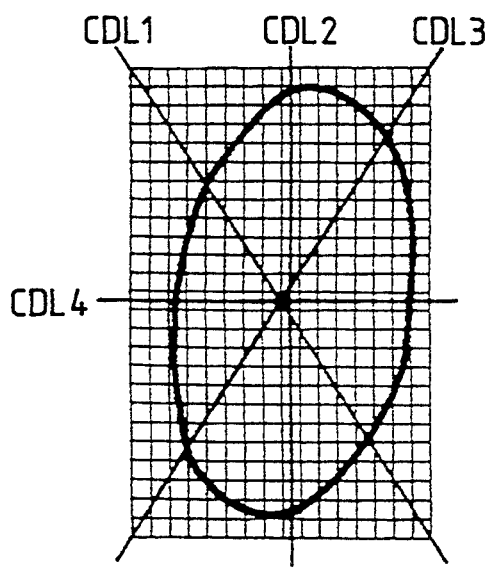
FIGS. 5A and 5B are explanatory views of examples of concentric characteristic division lines according to the invention.
Figure 5B:
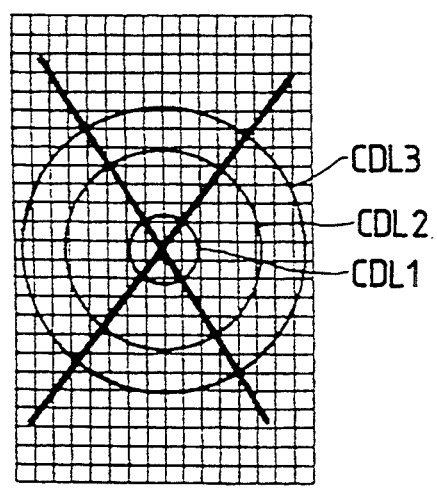

As has been described heretofore, according to the invention, by adding the addresses of pixels to the membership function data, an arbitrary characteristic division area can be defined in a software manner every pattern. For example, there can be defined various characteristic division areas CDA 1-3 as shown in FIGS. 3A to 3C.

As has been described heretofore, the present invention provides the following effects.

The fuzzy neuron is not fixed in a hardware manner for the purpose of recognition of a specific pattern, but it can be applied to an arbitrary pattern in a software manner by rewriting the membership functions.

Due to the fact that various characteristic division areas can be defined, it is possible to set a characteristic division area best for recognition for every pattern and thus a rate of recognition can be enhanced to a great extent when compared with the prior art.

What is claimed is:

1. A fuzzy neuron for serial processing of data relating to pixels in an input pattern, comprising;

storage means including an image memory for storing pixel pattern data corresponding to a pattern to be recognized, and a membership function memory for storing (a) a membership function value related to selected pixels in an input pattern, (b) the pattern addresses of each of a plurality of pixels of input pattern data in which said membership function value is defined, and (c) a membership function identifier to which said membership function values belong in a set in stored in the membership function memory; and means for processing the membership function values to determine the probability of a match between the input pattern and the pattern to be recognized.

2. A fuzzy neuron for serial processing of data relating to pixels in an input pattern, comprising:

storage means for storing (a) pixel pattern data corresponding to a pattern to be recognized, (b) a membership function value related to selected pixels in an input pattern and (c) a pattern address of each of a plurality of pixels of input pattern data, said membership function value being defined in a set in which each membership function value has an identifier and in such a manner that said values and addresses are previously sorted in the order of membership function identifiers; and means for processing the membership function values to determine the probability of a match between the input pattern and the pattern to be recognized.

3. A fuzzy neuron system comprising:

an image memory for storing pixel pattern data corresponding to a pattern to be recognized;

a membership function memory for storing the following three data in a set, (a) a membership function which may be a passing or a forbidden membership function related to selected pixels in an input pattern, (b) an identifier of the membership function, and (c) pattern addresses of respective pixels in an input pattern corresponding to the respective elements of the membership function;

a temporary memory for storing partial results of an operation; means for calling out pattern data from the image memory in accordance with an address signal called out from the membership function memory;

means for calling the partial results of an operation from the temporary memory in accordance with an identifier signal called from the membership function;

means for performing a pattern recognition operation using the membership function, pattern data and partial operation results and for storing an operation result again in the temporary memory in accordance with an identifier signal;

means for performing a minimum value operation on all data stored in the temporary memory after all data in the membership function memory are called out; and means for performing a reverse processing on forbidden membership functions when performing the minimum value operation.

4. A fuzzy neuron system comprising:

an image memory for storing pixel pattern data corresponding to a pattern to be recognized;

a membership function memory for storing the following two data in a set, a membership function which may be a passing or a forbidden membership function relating to selected pixels in an input pattern, pattern addresses of respective pixels corresponding to respective elements of the membership function, and signals to indicate divisions of a membership function;

a temporary memory for storing a partial result of an operation;

means for updating a current address of the temporary memory each time a signal indicating a division of the membership function is called from the membership function memory;

means for calling pattern data from the image memory in accordance with an address signal called from the membership function memory;

means for performing a pattern recognition operation using the membership function, pattern data and the partial operation result called from a current address of the temporary memory, and storing an operation result again in the current address of the temporary memory;

means for performing a minimum value operation on all data stored in the temporary memory after all data in the membership function memory are called; and means for performing a reverse processing on forbidden membership functions when performing the minimum value operation.

* * * * *

UNITED STATES PATENT AND TRADEMARK OFFICE
CERTIFICATE OF CORRECTION

PATENT NO. : 5,450,526
DATED : September 12, 1995
INVENTOR(S) : Yukichi Koji, et al.

Page 1 of 2

It is certified that error appears in the above-indentified patent and that said Letters Patent is hereby corrected as shown below:

On the title page, item [75], Inventors:

tion)]: "Koji Yukichi; Oh Masanari" should read --Yukichi Koji; Masanari Oh--., Item [19], should read--Koji et al--.

Column 1, line 42     "FIG. "0"" should read --figure "0"--.

Column 3, line 16     "j=1,2 ..., MF(j)" should read --j=1,2, ...., m. When a characteristic division area, for which MF(j)--.

Column 3, line 28,   " $g_j = \bigvee_{J=1}^{K_j} \{\mu(j,i) \vee s(j,i)\}$ "
should read -- $g_j = \bigvee_{J=1}^{K_j} \{\mu(j,i) \wedge s(j,i)\} \cdots$ --.

Column 3, line 33     " $PRB(X=Y) = \bigvee_{J=1}^{m} \{F(g_j)\}$ "
should read -- $PRB(X=Y) = \bigwedge_{J=1}^{m} \{F(g_j)\} \cdots$ --.

UNITED STATES PATENT AND TRADEMARK OFFICE
CERTIFICATE OF CORRECTION

PATENT NO. : 5,450,526
DATED : September 12, 1995
INVENTOR(S) : Yukichi Koji, et al.

It is certified that error appears in the above-indentified patent and that said Letters Patent is hereby corrected as shown below:

Column 7, line 10, "notifying" should read --notifying that--.

Signed and Sealed this

Twenty-seventh Day of February, 1996

Attest:

BRUCE LEHMAN

Attesting Officer      Commissioner of Patents and Trademarks